US011500855B2

(12) United States Patent
Bohm et al.

(10) Patent No.: US 11,500,855 B2
(45) Date of Patent: Nov. 15, 2022

(54) ESTABLISHING TRANSACTION METADATA

(71) Applicant: International Business Machines Corporation, Armonk, NY (US)

(72) Inventors: Fraser P. Bohm, Hursley (GB); Michael D. Brooks, Hursley (GB); Martin W. Cocks, Hursley (GB); Jenny J. He, Hursley (GB); Julian C. Horn, Hursley (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 965 days.

(21) Appl. No.: 14/955,136

(22) Filed: Dec. 1, 2015

(65) Prior Publication Data

US 2016/0275137 A1  Sep. 22, 2016

(51) Int. Cl.
*G06F 16/23* (2019.01)
*G06F 16/25* (2019.01)

(52) U.S. Cl.
CPC ...... *G06F 16/2379* (2019.01); *G06F 16/2365* (2019.01); *G06F 16/252* (2019.01)

(58) Field of Classification Search
CPC ......... G06F 17/30377; G06F 17/30371; G06F 17/3056; G06F 16/2365; G06F 16/2379; G06F 16/252
USPC ....................................................... 707/607
See application file for complete search history.

(56) References Cited

U.S. PATENT DOCUMENTS

| | | | | |
|---|---|---|---|---|
| 5,819,281 A * | 10/1998 | Cummins | ............ | G06F 16/289 |
| 6,138,143 A | 10/2000 | Gigliotti et al. | | |
| 6,338,097 B1 * | 1/2002 | Krenzke | ................ | G06Q 10/06 719/329 |
| 6,760,844 B1 * | 7/2004 | McCarthy | ............... | G06F 21/31 709/203 |
| 6,973,491 B1 * | 12/2005 | Staveley | ............. | H04L 41/0253 709/223 |
| 7,289,964 B1 * | 10/2007 | Bowman-Amuah | ........................ | G06F 9/5038 705/1.1 |

(Continued)

FOREIGN PATENT DOCUMENTS

WO    WO-2008012333 A1 *  1/2008  ........... G06F 9/5055

OTHER PUBLICATIONS

M. Elias, et al.,"A Business Process Metadata Model for a Process Model Repository", Springer-Verlag Berlin Heidelberg, vol. 50, 2010, pp. 1-14.

*Primary Examiner* — Usmaan Saeed
*Assistant Examiner* — Jessica N Le
(74) *Attorney, Agent, or Firm* — Cantor Colburn LLP; Teddi Maranzano

(57) ABSTRACT

A computer-implemented method of establishing metadata associated with a transaction in a transaction processing system having application logic for executing the transaction, the computer-implemented method includes receiving, from a requestor, request data associated with the transaction, the request data comprising data and metadata. The method also includes peeking, during receiving the request data, of the request data looking for the metadata associated with the transaction and responsive to finding metadata associated with the transaction, directly instantiating an instance of application logic.

15 Claims, 5 Drawing Sheets

(56) References Cited

U.S. PATENT DOCUMENTS

| | | | | |
|---|---|---|---|---|
| 7,444,410 B1* | 10/2008 | Hichwa | G06F 16/951 | 709/228 |
| 7,475,088 B2* | 1/2009 | Ziegler | G06F 16/254 | |
| 7,908,125 B2* | 3/2011 | Yeh | G06F 16/283 | 703/2 |
| 8,156,448 B2* | 4/2012 | Niyogi | G06F 16/9577 | 715/854 |
| 8,219,520 B2* | 7/2012 | Li | G06F 16/254 | 707/602 |
| 8,463,787 B2* | 6/2013 | Kirshenbaum | G06F 16/137 | 707/737 |
| 8,639,729 B2 | 1/2014 | Patil | | |
| 8,689,295 B2* | 4/2014 | Hidalgo | H04L 63/04 | 726/4 |
| 8,700,562 B2* | 4/2014 | Schmitt | G06F 16/2358 | 707/607 |
| 8,725,644 B2 | 5/2014 | Schlesser et al. | | |
| 8,984,031 B1* | 3/2015 | Todd | G06F 16/13 | 707/823 |
| 9,489,376 B2* | 11/2016 | Thomason | G06F 40/289 | |
| 9,507,800 B2* | 11/2016 | Narayanamurthy | G06F 16/172 | |
| 9,569,477 B1* | 2/2017 | McSweeney | G06F 16/24532 | |
| 9,747,288 B1* | 8/2017 | Beckford | G06F 16/2365 | |
| 9,805,092 B1* | 10/2017 | Welton | G06F 17/30463 | |
| 9,984,238 B1* | 5/2018 | Roth | G06F 21/602 | |
| 2002/0029207 A1* | 3/2002 | Bakalash | G06F 16/30 | |
| 2003/0058277 A1* | 3/2003 | Bowman-Amuah | G06F 16/289 | 715/765 |
| 2004/0098454 A1* | 5/2004 | Trapp | G06Q 10/10 | 709/204 |
| 2004/0117358 A1* | 6/2004 | von Kaenel | G06Q 40/08 | |
| 2004/0267811 A1* | 12/2004 | Nelson | G06F 16/25 | |
| 2006/0294038 A1* | 12/2006 | Grossfeld | G06F 9/505 | |
| 2007/0143314 A1* | 6/2007 | Thomsen | G06F 16/21 | |
| 2008/0040265 A1* | 2/2008 | Rackley, III | G06Q 20/32 | 705/40 |
| 2008/0046506 A1* | 2/2008 | Broda | H04L 67/42 | 709/203 |
| 2010/0318858 A1* | 12/2010 | Essawi | G06F 16/283 | 714/49 |
| 2011/0131174 A1* | 6/2011 | Birch | G06F 16/22 | 707/607 |
| 2012/0084135 A1* | 4/2012 | Nissan | G06Q 30/0238 | 705/14.38 |
| 2012/0192253 A1* | 7/2012 | Betsch | G06F 21/31 | 726/4 |
| 2012/0239609 A1* | 9/2012 | Zhao | G06Q 10/0637 | 707/600 |
| 2013/0046547 A1 | 2/2013 | Drucker et al. | | |
| 2013/0080388 A1* | 3/2013 | Dwyer | G06F 16/24552 | 707/634 |
| 2014/0122411 A1* | 5/2014 | Teichmann | G06F 16/113 | 707/600 |
| 2014/0143543 A1* | 5/2014 | Aikas | H04L 67/1097 | 713/168 |
| 2014/0207682 A1* | 7/2014 | Wolfond | G06Q 20/027 | 705/44 |
| 2014/0279871 A1* | 9/2014 | Ochoa | G06F 16/273 | 707/610 |
| 2015/0006475 A1* | 1/2015 | Guo | G06F 16/1752 | 707/609 |
| 2015/0006910 A1* | 1/2015 | Shapiro | G06F 12/1408 | 713/190 |
| 2015/0059003 A1* | 2/2015 | Bouse | G06F 16/2228 | 726/28 |
| 2015/0088805 A1* | 3/2015 | Kakarla | G06F 16/217 | 707/600 |
| 2015/0088970 A1* | 3/2015 | Wei | H04L 67/01 | 709/203 |
| 2015/0186668 A1* | 7/2015 | Whaley | G06F 16/16 | 713/156 |
| 2015/0244705 A1* | 8/2015 | Flamini | H04L 29/08702 | 726/8 |
| 2016/0062918 A1* | 3/2016 | Androulaki | G06F 12/1408 | 713/193 |
| 2016/0179917 A1* | 6/2016 | Yurchenko | G06F 16/2365 | 707/615 |
| 2016/0179918 A1* | 6/2016 | Martin | G06F 16/951 | 707/613 |

* cited by examiner

ESTABLISHING TRANSACTION METADATA

FOREIGN PRIORITY

This application claims priority to United Kingdom Patent Application No. 1504710.3, filed 20 Mar. 2015, and all the benefits accruing therefrom under 35 U.S.C. § 119, the contents of which in its entirety are herein incorporated by reference.

BACKGROUND

The present invention relates to establishing metadata, and more specifically to establishing of metadata associated with transactions in an online transaction processing system.

On-Line Transaction Processing (OLTP) systems, such as CICS® TS for z/OS®, handle large volumes of requests by attaching one or more application logic tasks to process each request message. A notification layer task receives the request and starts a transaction to await the arrival of data associated with the request and to receive the data for further processing. Before each of these transactions can be started, metadata associated with the transaction, such as the transaction ID, the user ID under which the task is to be started, and the security credentials of the user have to be established. The places where this metadata may come from, such as OLTP system resources, http headers or security systems, differ from one request to another, therefore the OLTP system needs to be capable of handling different types of requests during still processing multiple concurrent requests. Typically this is done by the OLTP system starting a system establishment task for each request to establish the metadata which it then starts the transaction with.

The problem with this prior art method is that there is a processing overhead of starting two tasks for each request that the OLTP system receives when for optimum performance there would only be one task started. It would be desirable to provide a way to attempt to establish the metadata in a notification layer and when successful the need for an interim establishment task before the business logic executes is removed. Due to the amount of system resources the extra establishment task uses there is a limit imposed on the request processing rate. This in turn limits the performance of the OLTP system.

SUMMARY

According to an embodiment of the invention, a computer-implemented method of establishing metadata associated with a transaction in a transaction processing system having application logic for executing the transaction, the computer-implemented method includes receiving, from a requestor, request data associated with the transaction, the request data comprising data and metadata and peeking, of the request data looking for the metadata associated with the transaction. The method also includes directly instantiating an instance of application logic in response to finding metadata associated with the transaction. Direct instantiation of the logic layer after peeking the request data provides the advantage that an additional establish layer task to establish the metadata does not need to be instantiated.

Embodiments of the invention provide a system for establishing metadata associated with a transaction in a transaction processing system having application logic for executing the transaction. The system includes a request receiver which receives, from a requestor, request data associated with the transaction, the request data comprising data and metadata and a notification layer module, which during receiving the request data from the request receiver, peeks the received request data looking for metadata associated with the transaction. The system also includes an application logic initiator, which responsive to finding metadata associated with the transaction, directly instantiates an instance of application logic.

Embodiments of the invention also provide a computer program product for establishing metadata associated with a transaction in a transaction processing system having application logic for executing the transaction. The computer program product including a computer readable storage medium having program instructions embodied therewith, the program instructions executable by a computer to cause the computer to: receive, from a requestor, request data associated with the transaction, the request data comprising data and metadata; during receiving the request data, peek, of the request data looking for the metadata associated with the transaction; and responsive to finding metadata associated with the transaction, directly instantiate an instance of application logic.

BRIEF DESCRIPTION OF THE DRAWINGS

Embodiments of the present invention will now be described in more detail, by way of example only, with reference to the accompanying drawings, in which.

DETAILED DESCRIPTION

Figure 1:
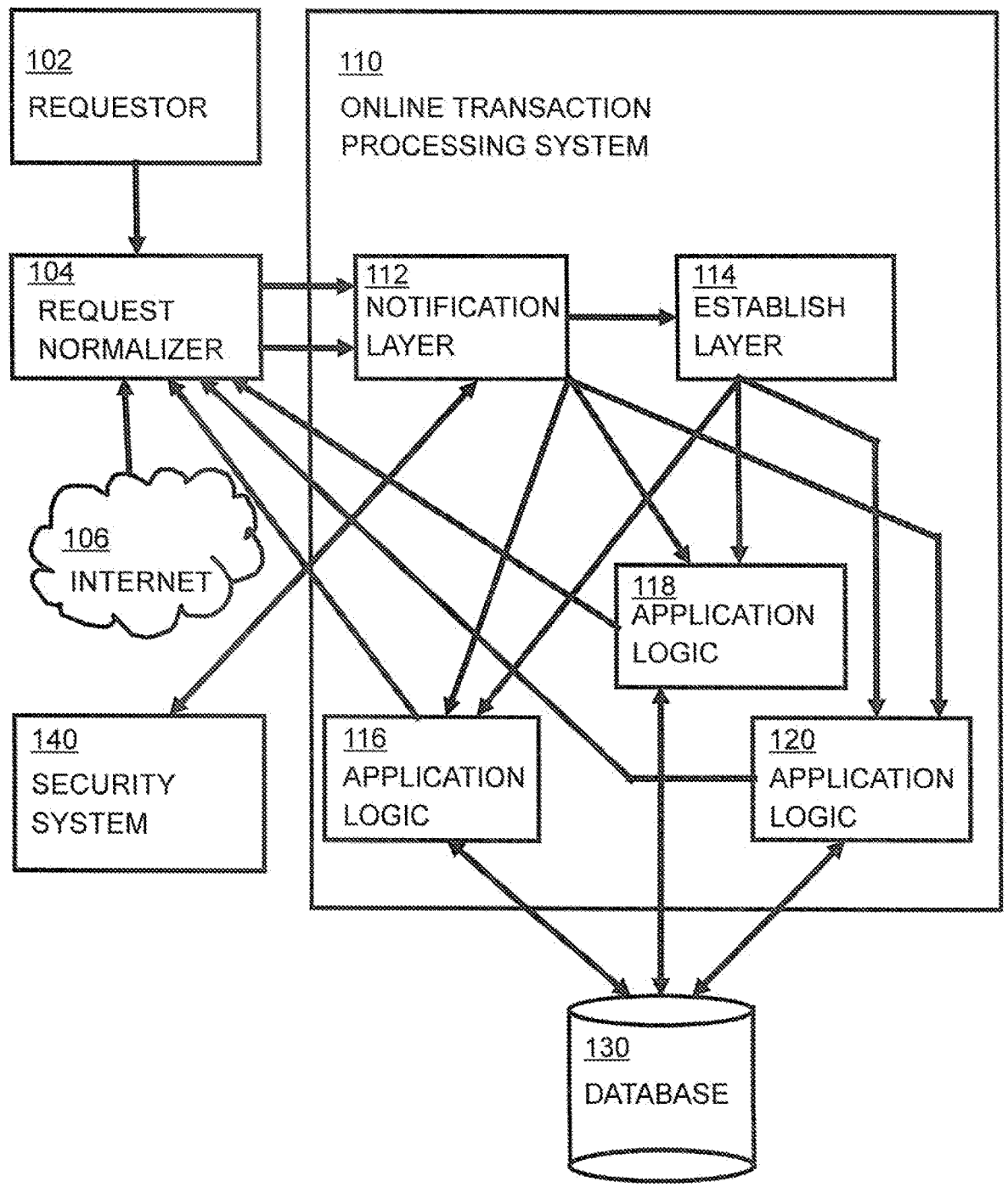
FIG. 1 shows a block diagram of an online transaction processing system in which embodiments of the present invention of establishing metadata associated with a transaction may be implemented.

FIG. 1 shows a block diagram of an online transaction processing system 110 in which embodiments of the present invention of establishing metadata associated with a transaction may be implemented. One or more requestors 102 generate transaction requests which are normalized by request normalizer 104 to provide normalized requests. The transaction requests may be generated by the requestor 102 in various formats including as XML or JSON Messages. Transaction requests may also be received over a wide area network, such as the Internet 106, in formats such as http, from a remote requestor. Transaction requests may be generated in any other format that can be handled by the request normalizer. The request normalizer 104 normalizes these transaction requests into a common format such as http or provides them to a particular socket of the online transaction processing system 110. The normalized requests 104 are submitted to notification layer 112 within the online transaction processing system 110. In an embodiment, a requestor generates transaction requests in a normalized format and submits them directly to the online transaction processing system 110. An example of a typical normalized request in http format is:

```
GET /sample_web_app HTTP/1.1
Accept: text/html, application/xhtml+xml, */*
Accept-Language: en-GB
User-Agent: Mozilla/5.0 (Windows NT 6.1; WOW64; Trident/7.0;
rv:11.0) like Gecko
Accept-Encoding: gzip, deflate
Host: www.hostsample.ibm.com:2136
Connection: Keep-Alive
Authorization: Basic QWxhZGRpbjpvcGVuIHNlc2FtZQ=
```

Notification layer 112 sends each request either to establish layer 114 or to one of application logics 116, 118, 120 for execution, responsive to a determination made according to the present invention and described later with reference to FIG. 3. Application logics 116, 118, 120 use database 130 as a resource to prepare responses to be returned to the requestor 102 or to the remote requestor over the internet 106. Any number of application logics 116, 118, 120 may be used. Any number of databases 130 may be used and in a typical system more than one database 130 is used. Responses are returned by application logics 116, 118, 120 through request normalizer 104 to the requestor 102 or over the internet 106 to the remote requestor. In an embodiment, responses are returned directly from the application logic 116, 118, 120 to the requestor 102 or over the internet 106 to the remote requestor. Security system 140 provides a security service to notification layer 112 and will be described in more detail below with reference to FIG. 4. Transaction requests may be of many different types, each type having different requirements in respect of response speed, accuracy and volume. Embodiments of the invention are particularly advantageously used for transaction requests that require short response times, are large volume and are mission-critical.

Figure 2:
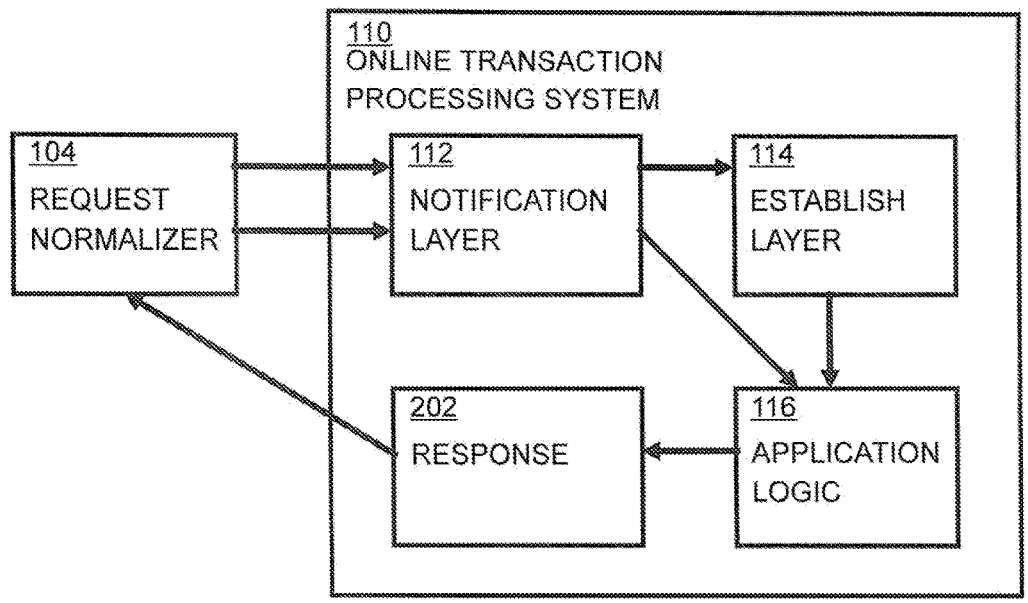
FIG. 2 shows a block diagram of software layers in the online transaction processing system of FIG. 1.

FIG. 2 shows a block diagram of software layers in the online transaction processing system 110 of FIG. 1. Normalized requests are received by notification layer 112 in the online transaction processing system 110 from request normalizer 104. In a typical environment, notification layer 112 is a long lived system task, but it is not necessary for embodiments of the present invention that it is a long lived task or that it is a system task. Notification layer 112 peeks the received request looking for transaction metadata. Notification layer 112 then either starts an establish layer task 114 and sends the request to the establish layer 114 or starts an application logic task 116 and sends the request to application logic 116, responsive to a determination made according to the present invention. Transaction metadata is described below with reference to FIG. 4, but briefly includes such information as a transaction ID, user ID and password (i.e. security credentials).

The determination by notification layer 112 of whether to send the request to establish layer 114 or to send the request to application logic 116 is done by examining metadata associated with the received normalized request and will be described in detail with reference to FIG. 3. If the request is sent by the notification layer 112 to the establish layer 114, then the establish layer 114 requests all of the data, including metadata, in the request from the request normalizer 104, works out the metadata for the application logic 116 and attaches the application logic 116. Establish layer 114 may then terminate. Application logic 116 executes the logic, based on the received request and returns response 202 to the request normalizer 104. If the request is to be sent by the notification layer 112 to the application logic 116, then the notification layer 112 works out the metadata such as which system resource is to serve the request, attaches the application logic 116 and passes the metadata to it. Application logic 116 executes the logic, based on the received request and returns response 202 to the request normalizer 104.

Figure 3:
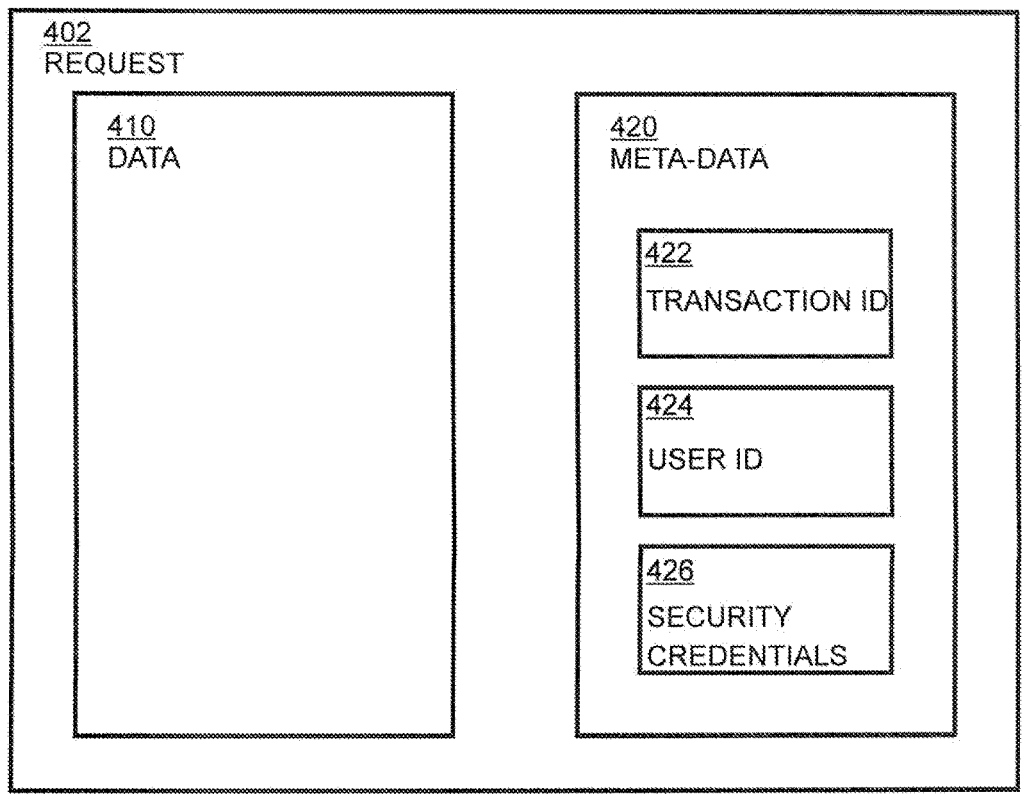
FIG. 3 shows a flow chart of an embodiment of a method of the present invention of establishing metadata associated with a transaction.

FIG. 3 shows a flow chart of an embodiment of a computer-implemented method of the present invention of establishing metadata associated with a transaction in an online transaction processing system having application logic for executing the transaction. This embodiment determines whether notification layer 112 should send the received request to establish layer 114 or send the received request directly to application logic 116. It does this by the notification layer 112, during receiving the request data, peeking the request looking for metadata associated with the transaction. Request data associated with a transaction is received from a requestor, the request data comprising data and metadata. During receiving the request data, the request data is peeked looking for the metadata associated with the transaction. Responsive to finding metadata associated with the transaction, an instance of a logic layer is directly instantiated. This has the advantage that instantiation of an establish layer 114 is not required where the notification layer 112 can determine which application logic 116, 118, 120 needs to be instantiated and any metadata necessary to be passed to the application logic 116, 118, 120 on instantiation. This provides the advantage of improving the request processing rate and thus the performance of the OLTP system.

The computer-implemented method starts at step 302. At step 304, a determination is made by the notification layer 112 as to whether the received request needs decoding. Decoding is needed if the received request is encrypted. If the received request needs decoding, then processing proceeds to step 310 described below. If the received request does not need decoding, then processing by the notification layer 112 proceeds to step 306. The notification layer 112 is optimized for finding metadata associated with a transaction that can be found in a straightforward manner. It is not optimized for finding metadata associated with a transaction that cannot be found in a straightforward manner, such as if it is encrypted, which is more appropriately handled by the establish layer 114. In an embodiment, the notification layer 112 does decrypt the received request and thus processing continues to step 306.

At step 306, a determination is made by the notification layer 112 as to whether enough data has arrived. The data arrives in chunks and a typical check as to whether enough data has arrived is to check that a complete block of data such as the first line of http request has been received in the chunk. Chunks are received into a buffer which may be 4 kB or so in size. If enough data has not arrived, then processing proceeds to step 310 described below. If enough data has arrived, then processing proceeds to step 308. The notification layer 112 is not optimized for finding metadata associated with a transaction that cannot be found in a straightforward manner, such as if sufficient data has not arrived, which is more appropriately handled by the establish layer 114.

At step 308, a determination is made by the notification layer 202 as to whether the metadata can be worked out. The header of a message should contain the request URI and the application logic 116, 118, 120 ID. These are used to determine which application logic 116, 118, 120 and which transaction ID are to be used. If the metadata cannot be worked out, then processing proceeds to step 310 described below. If the metadata can be worked out, then processing proceeds to step 312. The notification layer 112 is not optimized for finding metadata associated with a transaction that cannot be found in a straightforward manner, such as if the metadata cannot be worked out, which is more appropriately handled by the establish layer 114.

Figure 4:
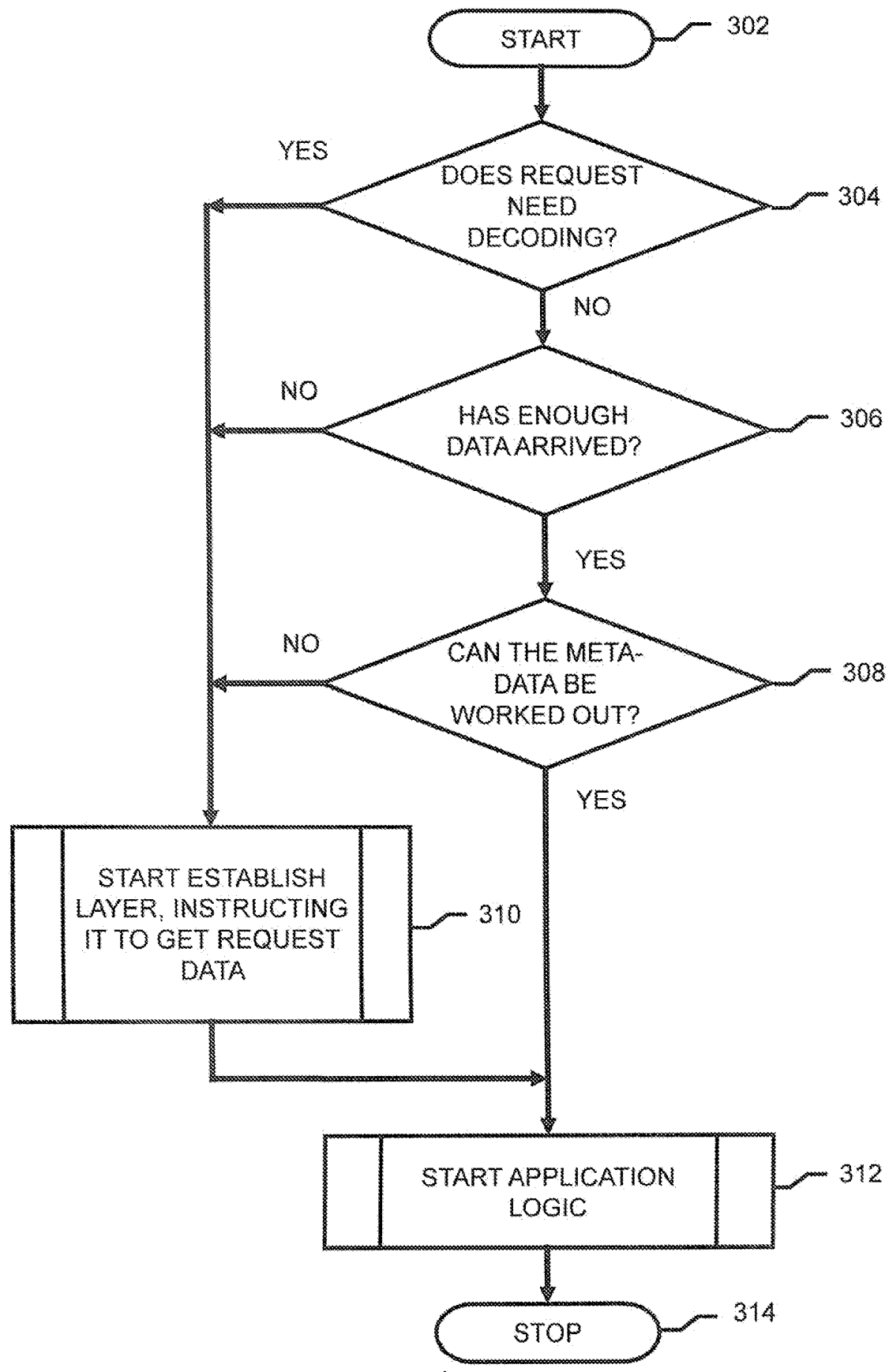
FIG. 4 shows a transaction request including exemplary metadata associated with a transaction.

Referring briefly to FIG. 4, which shows a request 402 for a transaction which may be embodied as a data structure that includes information that represents a request 402 for a particular task to be executed. For example, the request 402 for a transaction may include a request for an inventory list or to enter a debit or credit to an account.

In the example of FIG. 4, the request 402 for a transaction includes data 410 to be processed by the transaction and metadata 420 describing the data 410 and the request 402. Consider an example in which the request 402 for a transaction is a request 402 to enter a debit or credit to an account. In such an example, the data 410 to be processed by the transaction may include the account details for which the debit or credit is to be made and whether a debit or credit to the account is to be made. The metadata 420 describing the data 410 and the request 402 may include, for example, a transaction ID 422, userid 424 and security credentials 426. The metadata 420 may further comprise other items, such as transaction tracking data to tie together parts of a transaction executed elsewhere or a unit of recovery token to allow recovery to be coordinated or it may comprise different items to that shown in FIG. 4.

Transaction ID 422 may be, for example, ABCD, which may be a transaction ID provided by the OLTP system 110. Transaction ID 422 may come from the OLTP system's 110 system resource, such as a "Transaction" field or it may come from a specific HTTP header in the originating HTTP request which indicates the transaction ID.

Userid 424 may be, for example, any userid that the OLTP system 110 recognizes, such as, for example, "Aladdin". Userid 424 may come from the OLTP's 110 system resource, such as a "Userid" field. Userid 424 may come from an HTTP header in the originating HTTP request such as, for example, the HTTP header of "AUTHORIZATION: BASIC;" which indicates the userid. Further userid 424 may come from a security system 140 that the OLTP system 110 links to by looking for a userid 424 which matches a certificate being sent during a handshake process between the requestor and the OLTP system 110. If none of these provide a userid 424, then a default userid may be used by the OLTP system 110 to start the transaction.

Security credentials 426 may be, for example, the password of the userid 424 such as, for example, "open sesame". Security credentials 426 may come from an HTTP header in the HTTP request such as, for example, the HTTP header of "AUTHORIZATION: BASIC;" which indicates the security credentials 426 or it may come from a security system 140 that the online transaction processing system 110 links to by looking for a userid which matches a certificate being sent during a handshake process between the requestor and the online transaction processing system 110. If the OLTP system 110 does not need a userid 424 and security credentials 426 for a particular connection because that connection is trusted, the OLTP system 110 does not need to obtain the security credentials 426 at all. Other methods of obtaining security credentials 426 may be used and will be well known to persons skilled in the art.

An exemplary Authorization header may be constructed using the following steps:

1. Userid 424 and password 426 are combined into a single string "username:password", such as "Aladdin:open sesame";
2. The resulting single string is then encoded using the RFC2405-MIME variant of Base 64, with the exception that it is not limited to 76 characters per line. This may result in an encoded string of "QWxhZGRpbjpvcGVuIHNlc2FtZQ==" corresponding to the "Aladdin:open sesame" single string above; and
3. The authorization method and a space character, that is "Basic" is then placed before the encoded string, resulting in the encoded string:
"Authorization: Basic QWxhZGRpbjpvcGVuIHNlc2FtZQ=".

The prior art "AUTHORIZATION: BASIC" HTTP header described above is exemplary only. Other http headers and other forms of header may be used and will be familiar to persons skilled in the art.

Responsive to not finding metadata 420 associated with the transaction, the notification layer 112 passes the request 402 to an establish layer 114 to establish the metadata 420. That is, if the notification layer 112 has determined that (i) the request 402 does need decoding; (ii) enough data has not arrived; or (iii) the metadata 420 cannot be worked out, then processing will have proceeded to step 310. As the notification layer 112 could not establish the metadata 420, then the notification layer 112 starts the establish layer 114 in order for the establish layer 114 to establish the metadata 420. The establish layer 114 is instructed to get the request 402, from which it establishes the metadata 420. The establish layer 114 establishes the metadata 420 in accordance with the methods well known in the prior art. At step 312, the establish layer 114 starts the application logic 116, 118, 120 identified in the metadata 420 and the request 402, including the metadata 420, is then sent to the application logic 116 for execution. The computer-implemented method stops at step 314.

If at step 308, the metadata 420 could be worked out, that is the notification layer 112 determined that the request 402 does not need decoding, enough data has arrived and that the metadata 420 can be worked out, then processing proceeds to step 312. At step 312, the application logic 116, 118, 120 identified in the metadata 420 is started and the data, including the metadata 420, is then sent to the application logic 116 for execution. That is, the instantiated application logic 116, 118, 120 receives all of the request 402 data, executes the request and returns a response 202 either directly to the requestor 102 or through the request normalizer 104. The computer-implemented method stops at step 314.

Figure 5:
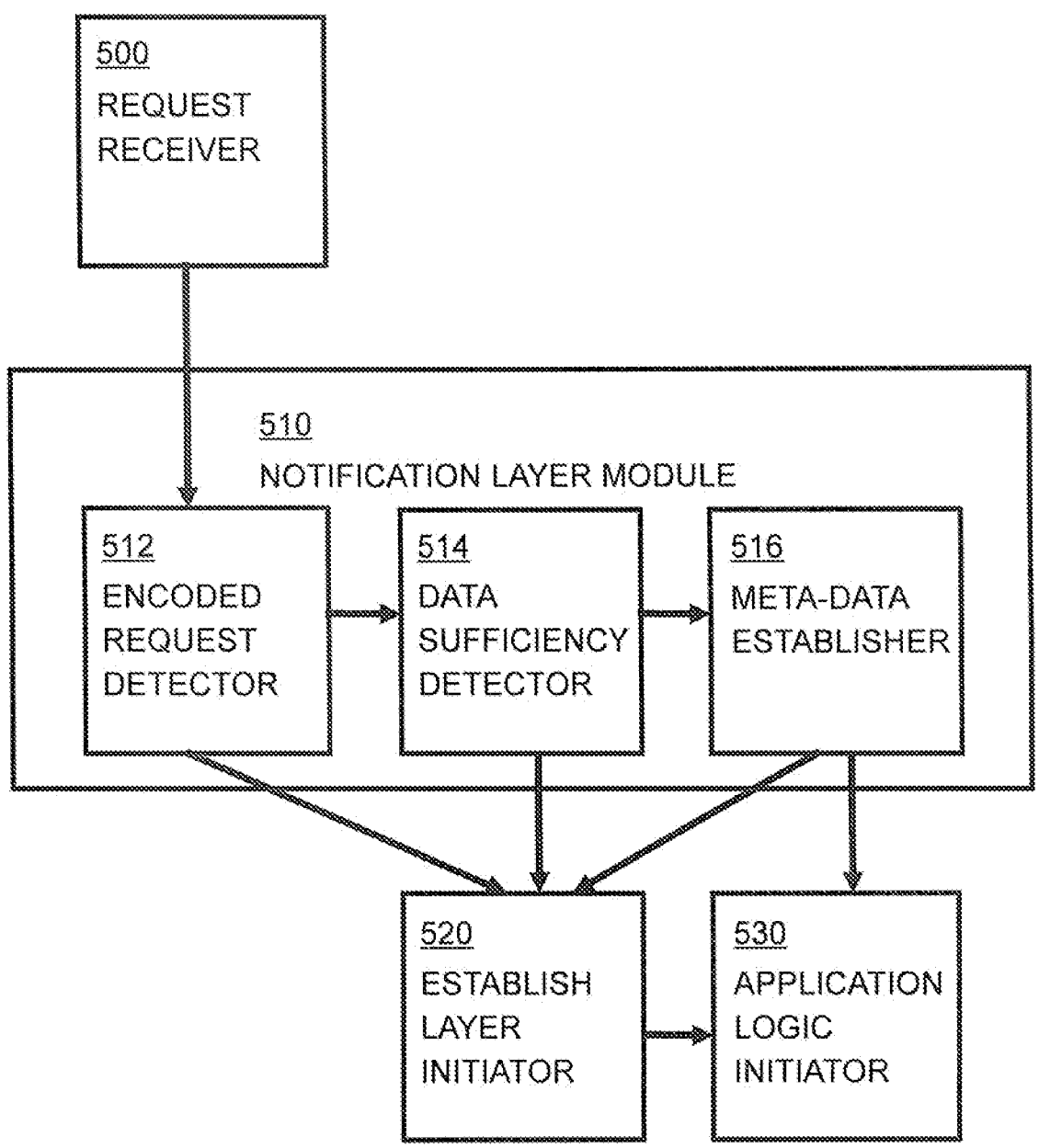
FIG. 5 shows a block diagram of an embodiment of a system according to the present invention of establishing metadata associated with a transaction.

FIG. 5 shows a block diagram of an embodiment of a notification layer module 510 according to the present invention. Request receiver 500 receives normalized requests from a request normalizer (104 in FIG. 1) and passes them on to notification layer module 510. Encoded request detector 512 detects whether the received request needs decoding. Decoding is needed if the received request is encrypted. If the received request needs decoding, then encoded request detector 512 passes the request to establish layer initiator 520 which processes the request as described below. If the received request does not need decoding, then encoded request detector 512 passes the request to data sufficiency detector 514.

Data sufficiency detector 514 detects whether enough data has arrived. The data arrives in chunks and a typical check as to whether enough data has arrived is to check that a complete block of data such as the first line of http request has been received in the chunk. Chunks are received into a buffer which may be 4 kB or so in size. If enough data has not arrived, then the data sufficiency detector 514 passes the request to establish layer initiator 520. If enough data has arrived, then data sufficiency detector 514 passes the request to metadata 420 establisher 516.

Metadata 420 establisher 516 detects whether the metadata 420 can be worked out. The header of a message should contain the request URI and the application logic 116, 118, 120 ID. These are used to determine which application logic 116, 118, 120 and which transaction ID are to be used. If the metadata 420 cannot be worked out, then metadata 420 establisher 516 passes the request to establish layer initiator 520. If the metadata 420 can be worked out, then metadata 420 establisher 516 passes the request to application logic initiator 530.

If the notification layer module 510 has determined that (i) the request does need decoding; (ii) enough data has not arrived; or (iii) the metadata 420 cannot be worked out then the request will have been sent to establish layer initiator 520. As notification layer module 510 could not establish the metadata 420, then notification layer module 510 passes the request to establish layer initiator 520 in order for the establish layer initiator 520 to establish the metadata 420. The establish layer initiator 520 is instructed to get the request data, from which it establishes the metadata 420. The establish layer initiator 520 establishes the metadata 420 in accordance with the methods well known in the prior art. The establish layer initiator 520 then sends the request to the application logic initiator 530 identified in the metadata 420 and the request, including the established metadata 420, is then sent to the application logic 116 for execution.

Figure 6:
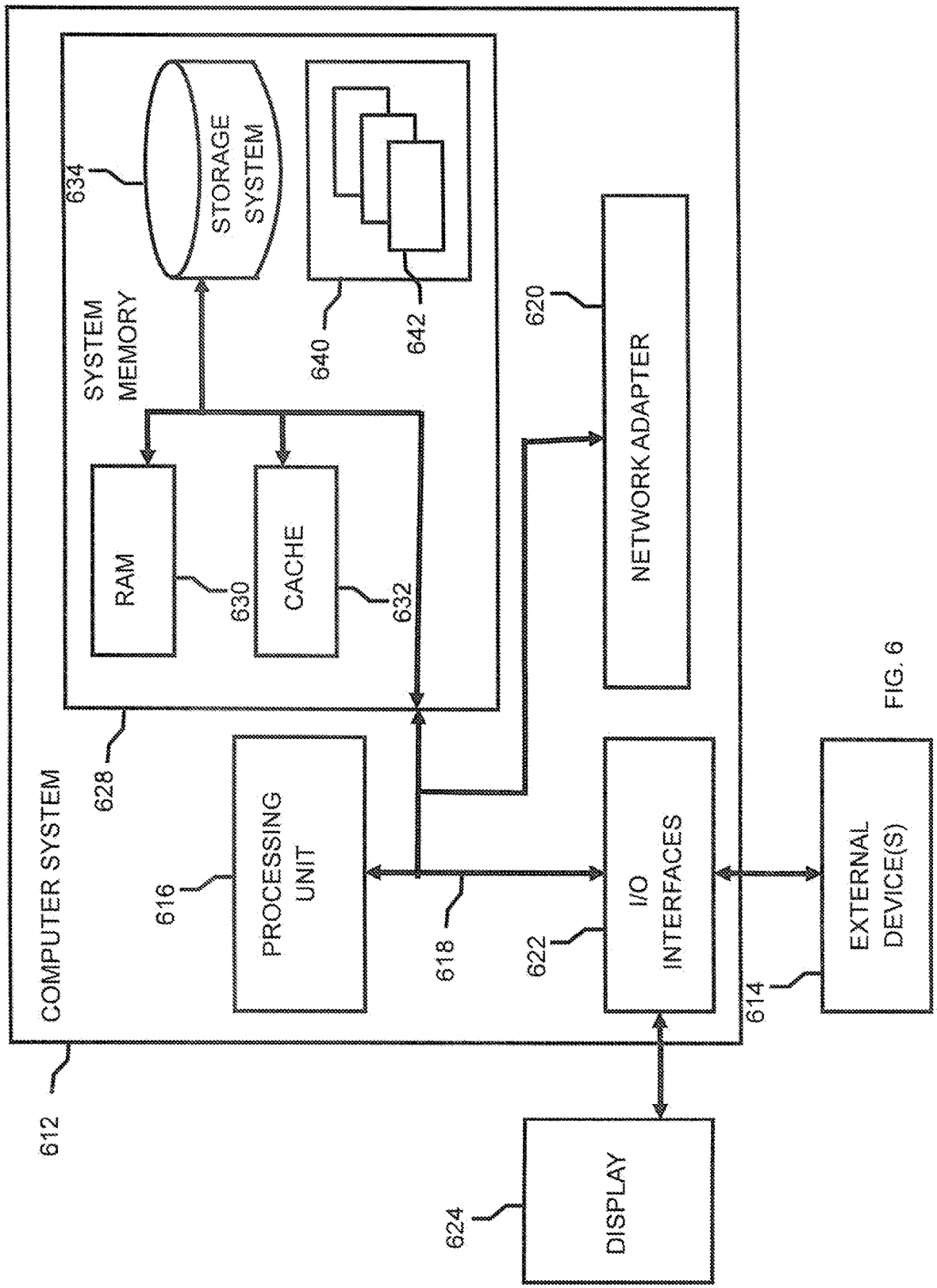
FIG. 6 shows a computer system according to an embodiment of the present invention of establishing metadata associated with a transaction.

Referring now to FIG. 6, a schematic of an example of computing system is shown. Computing system 612 is only one example of a suitable computing system and is not intended to suggest any limitation as to the scope of use or functionality of embodiments of the invention described herein. Regardless, computing system 612 is capable of being implemented and/or performing any of the functionality set forth hereinabove.

Computer system/server 612 is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices 614 that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method of establishing metadata associated with a transaction in a transaction processing system having application logic for executing the transaction, the computer-implemented method comprising:
receiving, by a notification layer of an online transaction processing system (OTPS) from a requestor, request data associated with the transaction, the transaction being an online transaction, the request data comprising data and metadata, the notification layer that initially received the request data being configured to start an application logic and to start an establish layer according to the metadata, wherein the request data is received in a plurality of chunks by the notification layer, the plurality of chunks being blocks of the request data;
based on the notification layer determining that a first chunk of the plurality of chunks has been received and the notification layer determining that a first line of a hypertext transfer protocol (HTTP) request has been received in the first chunk, reading, by the notification layer of the OTPS, the request data looking for the metadata associated with the transaction during receiving the request data to determine whether identification of the application logic of a plurality of application logics is present, wherein the metadata associated with the transaction comprises at least one of a transaction ID, a user ID and security credentials, wherein the request data comprises a format having the HTTP request;
responsive to the notification layer that initially received the request data searching in the request data and finding the metadata associated with the transaction, directly instantiating by the notification layer an instance of the application logic having been identified to process the request, directly instantiating the instance of the application logic comprising the notification layer starting the application logic, wherein the notification layer determines which system resource is to serve the request data and sends the metadata to the application logic, wherein the instance of the application logic is determined at least in part based on the metadata associated with the transaction; and
responsive to the notification layer that initially received the request data not finding the identification of the application logic to be selected for instantiation from the plurality of application logics in the metadata associated with the transaction where the metadata is received from the requestor, passing by the notification layer the request data to the establish layer on the OTPS to establish the metadata associated with the transaction, the establish layer having been passed the request data from the notification layer being different from the requestor.

2. The computer-implemented method of claim 1, wherein reading the request data does not find the metadata associated with the transaction because the request data was encrypted.

3. The computer-implemented method of claim 1, wherein reading the request data does not find the metadata associated with the transaction because insufficient data in the request has arrived from the requestor.

4. The computer-implemented method of claim 1, wherein passing the request data from the notification layer to the establish layer to establish the metadata associated with the transaction is further responsive to determining that the request data is not encrypted and determining that sufficient data in the request data has arrived from the requestor.

5. The computer-implemented method of claim 1, further comprising:
receiving, by the instantiated application logic, all of the request data;
executing, by the instantiated application logic, all of the request data; and
returning, by the instantiated application logic, a response to the requestor.

6. A system for establishing metadata associated with a transaction in a transaction processing system having application logic for executing the transaction, the system comprising:
a memory having computer readable instructions; and
a processor coupled to the memory for executing the computer readable instructions, the computer readable instructions configured to cause the processor to:
receive, by a notification layer from a requestor, request data associated with the transaction, the request data comprising data and metadata, the transaction being an online transaction, the notification layer that initially received the request data being configured to start an application logic and to start an establish layer according to the metadata, wherein the request data is received in a plurality of chunks by the notification layer, the plurality of chunks being blocks of the request data;
monitor an amount of data that has been received from the requestor;
based on the notification layer determining that a first chunk of the plurality of chunks has been received and the notification layer determining that a first line of a hypertext transfer protocol (HTTP) request has been received in the first chunk, read by the notification layer the received request data looking for metadata associated with the transaction to determine whether identification of the application logic of a plurality of application logics is present, wherein the metadata associated with the transaction comprises at least one of a transaction ID, a user ID and security credentials, wherein the request data comprises a format having the HTTP request; and
responsive to the notification layer that initially received the request data searching in the request data and finding the metadata associated with the transaction, instantiate by the notification layer an instance of the application logic having been identified to process the request, directly instantiating the instance of the application logic comprising the notification layer starting the application logic, wherein the notification layer determines which system resource is to serve the request data and sends the metadata to the application logic, wherein the instance of the application logic is determined at least in part based on the metadata associated with the transaction; and responsive to the notification layer that initially received the request data not finding the identification of the application logic to be selected for instantiation from the plurality of application logics in the metadata associated with the transaction where the metadata is received from the requestor, pass by the notification layer the request data to the establish layer to establish the metadata associated with the transaction, the establish layer having been passed the request data from the notification layer being different from the requestor.

7. The system of claim 6, wherein reading the request data does not find the metadata associated with the transaction because the request data was encrypted.

8. The system of claim 6, wherein reading the request data does not find the metadata associated with the transaction because insufficient data in the request has arrived from the requestor.

9. The system of claim 6, wherein passing the request data from the notification layer to the establish layer to establish the metadata associated with the transaction is further responsive to determining that the request data is not encrypted and determining that sufficient data in the request data has arrived from the requestor.

10. The system of claim 6, wherein the application logic receives all of the request data, executes all of the request data, and returns a response to the requestor.

11. A computer program product for establishing metadata associated with a transaction in a transaction processing system having application logic for executing the transaction, the computer program product comprising:
 a computer readable storage medium having program instructions embodied therewith, the program instructions executable by a computer to cause the computer to:
 receive, by a notification layer from a requestor, request data associated with the transaction, the transaction being an online transaction, the request data comprising data and metadata, the notification layer that initially received the request data being configured to start an application logic and to start an establish layer according to the metadata, wherein the request data is received in a plurality of chunks by the notification layer, the plurality of chunks being blocks of the request data;
 based on the notification layer determining that a first chunk of the plurality of chunks has been received and the notification layer determining that a first line of an http request has been received in the first chunk, read by the notification layer the request data looking for the metadata associated with the transaction during receiving the request data to determine whether identification of the application logic of a plurality of application logics is present, wherein the metadata associated with the transaction comprises at least one of a transaction ID, a user ID and security credentials, wherein the request data comprises a format having the HTTP request;
 responsive to the notification layer that initially received the request data searching in the request data and finding the metadata associated with the transaction, directly instantiate by the notification layer an instance of the application logic having been identified to process the request, directly instantiating the instance of the application logic comprising the notification layer starting the application logic, wherein the notification layer determines which system resource is to serve the request data and sends the metadata to the application logic, wherein the instance of application logic is determined at least in part based on the metadata associated with the transaction; and
 responsive to the notification layer that initially received the request data not finding the identification of the application logic to be selected for instantiation from the plurality of application logics in the metadata associated with the transaction where the metadata is received from the requestor, passing by the notification layer the request data to the establish layer to establish the metadata associated with the transaction, the establish layer having been passed the request data from the notification layer being different from the requestor.

12. The computer program product of claim 11, wherein reading the request data does not find the metadata associated with the transaction because the request data was encrypted.

13. The computer program product of claim 11, wherein reading the request data does not find the metadata associated with the transaction because insufficient data in the request has arrived from the requestor.

14. The computer program product of claim 11, wherein passing the request data from the notification layer to the establish layer to establish the metadata associated with the transaction is further responsive to determining that the request data is not encrypted and determining that sufficient data in the request data has arrived from the requestor.

15. The computer program product of claim 11, further comprising program instructions executable by a computer to cause the computer to:
 receive, by the instantiated application logic, all of the request data;
 execute, by the instantiated application logic, all of the request data; and
 return, by the instantiated application logic, a response to the requestor.

* * * * *